Sept. 29, 1953     A. L. ANDERSON ET AL     2,653,328

FABRICATION OF ARTIFICIAL EYES

Filed Sept. 22, 1945

Inventors
Albert L. Anderson
John D. Holmen
By Williamson & Williamson
Attorneys Patented Sept. 29, 1953

2,653,328

UNITED STATES PATENT OFFICE 2,653,328

FABRICATION OF ARTIFICIAL EYES

Albert L. Anderson and John Donald Holmen, Minneapolis, Minn., assignors, by mesne assignments, to Precision Cosmet Company, Inc., Minneapolis, Minn., a corporation of Minnesota Application September 22, 1945, Serial No. 617,960

2 Claims. (Cl. 3—13)

This invention relates to the fabrication of artificial eyes from plastic materials.

It is an object of our invention to provide a materially improved artificial eye constructed throughout of plastic materials; simulating very closely the appearance of a natural eye and particularly well adapted for fit, mobility and proper alignment for the particular case.

A further object is the provision of a comparatively simple, highly accurate and commercially practical method of fabricating both custom built and stock eyes for restorative use.

Another and more specific object is the provision of an improved method utilizing plastic materials throughout of fabricating an artificial eye wherein the iris and pupil portions appear to have the depth of those parts in natural eyes and may be advantageously custom built to simulate exceedingly well, the natural eye with which associated.

It is a more specific object to construct the iris portion of an artificial eye by application of a multiplicity of superimposed coatings or layers of plastic, preferably thermoplastic materials, successively applied in fluid state over a white, translucent sclera area with alternate of said thin coatings being painted in conformity to the design of the natural eye to be simulated and the intermediate coatings being of transparent plastic material applied in fluid state and with the provision of a plastic, transparent iris disc covering said superimposed coatings and welded integrally with said plastic coatings and the plastic material of the sclera section.

Still another object is the provision of method steps in the fabrication of an artificial eye which materially facilitate the handling of the parts and integral restorative during fabrication of the iris and sclera sections as well as in the molding of the body and welding of the iris portion thereto and which further, facilitates correct alignment of the visual axis.

These and other objects and advantages of our invention will be more apparent from the following description made in connection with the accompanying drawings wherein like reference characters refer to the same parts throughout the several views and in which.

Figures 13 to 16 inclusive are views in cross section illustrating the steps of an alternative form of the method invention wherein the complete body or sclera is first molded or die cast from plastic material.

In carrying out our improved method of fabrication as illustrated in Figs. 1 to 12 of the drawings, plastic materials preferably of the thermoplastic variety are preferably utilized for all portions of the restorative including even the coloring material or coatings painted or otherwise applied in simulation of the iris, pupil and veins. It will be understood that while at the present time thermoplastic materials such as methyl methacrylate and other synthetic resins are preferred, that plastic materials of the thermo-setting variety may be successfully utilized and with the rapid improvement in such materials, may be of equal preference in the future.

In carrying out our method for the fabrication of a custom built, artificial eye an impression of the anophthalmic socket is first made by injection-impression technique, compression-impression technique or any of the other several methods which are in common, successful practice at this time.

From said impression, a wax model is made by utilizing the approved known methods and is constructed to fit the socket and eyelids as the finished plastic eye is to fit.

With our method, a special and novel, plastic iris-simulating button is associated with the wax model in forming the mold for the plastic body or sclera of the restorative and constitutes in the finished plastic structure, the iris section and also preferably a thin disc section of the sclera.

The iris-simulating button may be selected from a multiplicity of pre-formed buttons to match the patient's eye or may itself, be custom made for the particular patient.

In any event, the preferred steps in fabricating said iris-simulating buttons are as follows:

A thin sclera disc section, 20 constituting the back or base of the button is prepared preferably by molding a disc from white plastic such as acrylic having either a flat or a contoured base, 20a and preferably a concave face 20b upon which iris-simulating coatings are adapted to be applied or painted. The face 20b is provided with a small central recess 20c for receiving jet black plastic pigment, simulating the pupil.

Figure 1:
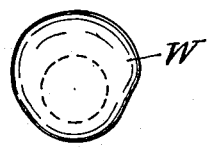
Fig. 1 is a perspective view showing a wax pattern of the restorative made in conformity to the anophthalmic socket, the dotted circular line indicating the subsequent positioning of the button structure, which in the preferred form of our fabrication, includes an iris and a sclera section.
Figure 2:
Fig. 2 is a plan view of one of our sclera discs before painting of the iris design thereon.
Figure 3:
Fig. 3 is a vertical section through the disc of Fig. 2.
Figure 4:
Fig. 4 is a front plan view of the sclera disc fabricated with a multiplicity of thin coatings to simulate the design of the iris.
Figure 5:
Fig. 5 is a vertical section of the disc of Fig. 4.

The recess is then densely coated with an acrylic jet black substance, thereafter the pictorial iris-simulation is built up in a succession of several thin layers or coatings of fluid plastic material such as acrylic, said coatings being applied to the concave face 20b of the disc. Thus, as shown in Figs. 4 and 5, the iris face 20b is first painted with a pigment-containing fluid plastic such as acrylic, the proper color or colors being utilized in accordance with the experience of the technician or manufacturer. Usually, three or four zones of color are discernible in the average natural iris such as green, blue, yellow and orange or red. The background color, painted on by lines as well as tone sections, is applied preferably first, to the surface 20b and the plastic material applied in fluid state is then cured. Thereafter, in accordance with our method, a thin coating of transparent plastic material is applied over the back-ground colored coating and in turn, is cured and integrally welded with the first coating and the disc 20. Over this transparent coating, a second color coating of fluid plastic material is applied, usually occupying less of the diameter and area of the disc 20 than the first color coating and this may be applied, as in the case of all of said coatings by painting or by printing method. Successive coatings are similarly applied, the pigment-containing coatings being alternated with the clear, transparent coatings to give depth to the simulated iris and to produce a blending effect of the various colors and designs formed to produce cumulatively, a very accurate simulation of a human iris. We prefer to apply from 10 to 25 coatings, half of which are colored.

Figure 6:
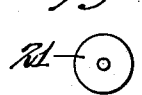
Fig. 6 is a plan view of the iris disc with handle stem attached.
Figure 7:
Fig. 7 is a side elevation of the same.

As shown in Figs. 6 and 7, a plastic, transparent stem-attached iris disc or cornea 21 is formed by molding a disc from transparent acrylic or other suitable plastic material having preferably convex rear and front surfaces 21a and 21b respectively, the back surface 21a being adapted to nicely fit the concave, multi-coated surface 20d while the front convex surface 21b is contoured on a curve or arc consistent with that of the human eye to be matched. The integrally formed handle stem 21c extends axially from the front face 21b of the iris disc and has numerous advantages in carrying out our method as will hereafter be explained. Among other advantages, the stem 21c provides an ejector pin for removal of the iris disc 21 from the mold as well as furnishing a handle for manipulating and locating the iris button during processing and molding of the body or sclera.

Figure 8:
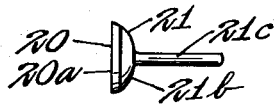
Fig. 8 is a side elevation of the complete button formed by welding together the sclera disc with the iris-simulating coatings thereon and with the iris disc and handle stem.

The stem-attached iris disc 21 is next, concentrically welded to the concave, multi-coated and painted surface 20b of the thin sclera disc 20, as shown in Fig. 8, forming the completed plastic, iris-simulating button.

In commercial use, we find it advantageous to pre-form a large number of said iris-simulating buttons, coloring and decorating the same by our multi-layer, built up process, to closely simulate the various typical irises of human eyes. When such is done, the appropriate iris button may be selected from a large number of different buttons, to precisely match the natural eye of the patient, comparison being made by holding the respective buttons by means of the handle stem 21c, one at a time, next to the iris of the natural eye.

While we prefer to apply and build up the multi-layer, pigmented simulation of the iris design upon the forward, preferably concave face of the thin sclera disc constituting a part of the pre-formed iris-simulating button, we have also found that the superimposed, alternate coatings of colored plastic material and transparent plastic may be applied to the rear face 21a of the iris disc or cover 21, as may the axially disposed jet plastic pigment, representing the pupil of the eye.

Figure 9:
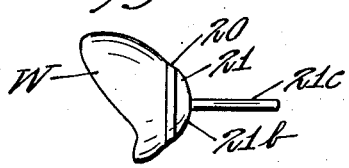
Fig. 9 illustrates the step of applying the completed button to the wax pattern prior to investing of the pattern.

The next step of our method is the application and connection of the pre-formed iris-simulating button with the custom built, wax model W to obtain proper alignment of the artificial pupil and iris in accordance with the visual axis of the natural eye. Here again, the handle stem 21c of the button is of great utility, in properly positioning the button with respect to the wax model. The button is applied, as shown in Fig. 9, being slightly embedded in the wax of the model and bonded thereto and the proper alignment may be obtained by physical insertion of the wax model in the socket of the patient and location of the button with the assistance and manipulation of the handle stem 21c.

Figure 10:
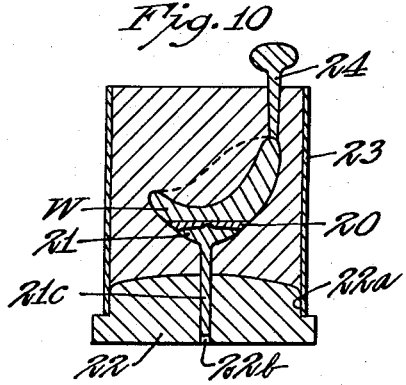
Fig. 10 shows the step of investing the pattern and model in a mold-forming flask such as is used in dental work.
Figure 11:
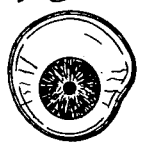
Fig. 11 shows a front perspective view of the complete artificial eye.
Figure 12:
Fig. 12 shows a vertical section taken on the line 12—12 of Fig. 11.

The wax model of the sclera with the preformed plastic iris button attached thereto, are then invested with plaster of Paris or other mold-forming investment material of the type used in dental castings. The mold may be formed from the wax model with the plastic iris button attached thereto, by any suitable, successful prior art method, such as for example, the investment of the model to form a split or two part mold. Fig. 10 illustrates an efficient means of forming the mold for the sclera. Here, a dental flask of the type utilizing a crucible-forming disc 22, is shown, having the annular shoulder 22a for receiving the lower end of an investment ring 23 and having the axial passage 22b for anchoring a sprue former. The handle stem 21c of the pre-formed iris button is secured in the upper end of the passage 22b of the crucible-former, a drop of wax or other material being applied to retain the lower end of the stem in the passage. A sprue-former 24 in the form of a small stem having a head for facilitating removal thereof from the mold is then preferably waxed to the uppermost portion of the wax model W and disposed substantially vertically. The wax pattern W and the iris button may then be initially coated by brush or otherwise, with comparatively thick investment material, whereafter the investment ring 23 may be applied as shown, to the crucible former and the investment completed, by filling the crucible formed by the former 22 and the ring.

After the investment material has dried, the sprue-former and crucible former are removed and the wax model may then be eliminated by applying heat or steam to the ends of the investment ring leaving a mold cavity for receiving and molding the plastic material to constitute the body or sclera of the restoratives.

The mold cavity is then charged through the formed sprue with white preferably, thermoplastic material such as acrylic with of course, the iris button contained in the crucible.

The sclera or body of the artificial eye is thus produced with the plastic, pre-formed iris button integrally welded into a homogeneous mass therewith.

Thereafter, the artificial eye with the handle stem 21c still attached, may be fitted into the anophthalmic socket of the patient, touched up and properly adjusted for most efficient fitting and thereafter, the stem is cut off and the iris face 21b polished and properly conformed to the adjacent sclera portion.

The representation of veins or blood vessels is then painted or otherwise applied by fluid plastic material such as acrylic to the appropriate portions of the sclera.

We then prefer to cover the portions of the sclera adjacent the iris disc 21 with a thin coating 25 of fluid, transparent plastic material as acrylic to simulate the conjuctiva of the natural eye. This coating is thereafter cured and integrally united with the sclera to complete the fabrication of our artificial eye.

With our improved method, very excellent and accurately fitting artificial eyes may be produced, constructed throughout of plastic materials and simulating very closely the appearance of a natural eye and when custom built, matching quite perfectly the natural eye. Due to the multi-layer formation of the iris with alternate depth layers of transparent plastic material, actual depth is created in the iris section simulating very closely the natural eye. The effect of depth is enhanced by lens effect produced from the iris covering portion or disc 21 of the iris button.

In commercial work, a large stock of preformed iris buttons of various color combinations may be carried and the appropriate button selected to precisely match the natural eye and the sclera of the restorative, custom built to the patient with the selected iris button integrally formed therewith.

The use of the stem 21c of the iris button not only provides a convenient manipulating handle for testing the wax model in the anophthalmic socket, but also enables the iris portion to be accurately positioned and connected with the wax model for reproduction of the plastic sclera in true conformance to the visual axis of the natural eye. With our method, the iris button and its stem 21c facilitates the mounting and investing of the wax model to form the mold for the plastic sclera. From the foregoing description it will be seen that our method is simple, accurate and may be readily practiced by those having a reasonable degree of skill in the art. With our method, complete restoratives may be accurately constructed in a comparatively short time particularly when a stock of pre-formed iris buttons is maintained.

In Figs. 13 to 16 inclusive, the fabrication of a somewhat different artificial eye is shown, utilizing a number of steps and principles of the method previously disclosed. This method is adapted for the construction of custom eyes but is particularly well adapted for the fabrication of stock eyes.

Figure 13:
Figure 14:
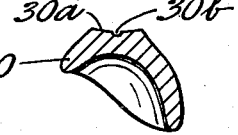

As illustrated in Fig. 13 a complete body or sclera 30 is first molded or die cast from white plastic material such as acrylic being either formed in a mold or dies of a predetermined configuration or being formed from a mold made in conformance to a wax pattern made from the anophthalmic socket. The body 30 is then preferably placed on a suitable holder or jig beneath a rotary grinding tool which is shaped to grind, as illustrated in Fig. 14, a concave pigment-receiving surface 30a properly aligned for the visual axis of the natural eye and simultaneously, a central depressed pupil-simulating socket 30b.

Figure 15:
Figure 16:
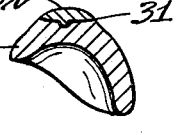

The pupil socket 30b is then coated with jet acrylic material which is cured to integrally weld the same to the sclera and thereafter, as illustrated in Fig. 15, alternate layers of pigment-containing plastic or acrylic material and clear transparent acrylic material 31 are painted and coated or otherwise applied as by print or decalcomania process in layer built style. We prefer to utilize from ten or twenty of said coatings or layers 31. The layers are successively cured and integrally bonded with the plastic material below and the body 30 with the layers applied, is taken to a mold or die and the iris forming disc or lens 32 integrally molded or die cast therewith. The iris disc 32 in this form of the invention is constructed of clear, transparent plastic material such as acrylic and in the mold is of course, integrally welded to the sclera and layers of iris simulating material built up on concave surface 30a.

Thereafter, the sclera portion adjacent the iris is painted or printed with red lines formed from plastic material such as acrylic to simulate the blood vessels and a coating of transparent plastic material is superimposed over the sclera surrounding the iris to simulate the conjuctiva of the natural eye.

Restoratives constructed from this last described adaptation of our method are very lifelike in appearance and this method is particularly adapted for the fabrication of a variety of stock eyes of various shapes, configurations and iris ormentation.

What is claimed is:

1. The method of fabricating artificial eyes, which comprises forming from thermoplastic material, a body including at least a generally circular sclera section, producing on the face of said sclera section, a circular area adapted to receive iris-simulating coatings, producing in the center of said circular area a small recess for receiving pigment, simulating a pupil, first applying black thermoplastic to said recess portion, then applying successive complete alternate layers of pigmented thermoplastic fluid simulating the markings of an iris and transparent plastic fluid to said circular area surrounding said pupil-simulating recess, successively curing said completed layers upon application thereof, forming an iris button having a convex face and constructed of transparent thermoplastic material, welding said iris button coaxially over said circular coated area to form an integral, homogeneous, thermoplastic mass and coating the face of said mass so formed with transparent, thermoplastic fluid and curing the same.

2. As an article of manufacture, an iris button for artificial eyes constructed entirely of plastic material comprising, a thin scleral section having a circular face area, and having a concave outer surface with a small recess formed centrally therein, a coating of jet black thermoplastic material within said recess, a plurality of complete layers of plastic material superimposed on said concave surface cumulatively simulating the marking and colors of a natural iris, alternate of said layers being formed of coatings of color-containing plastic material and coatings of transparent plastic material, an iris cover section having a circular face area complementary to the face area of said scleral section and having a transparent convex exterior surface, said layers, said coatings and said face area being integrally welded together to form a button.

ALBERT L. ANDERSON.
JOHN DONALD HOLMEN.

References Cited in the file of this patent

UNITED STATES PATENTS

| Number | Name | Date |
|---|---|---|
| 2,497,872 | Erpf et al. | Feb. 21, 1950 |

OTHER REFERENCES

Humphrey, F. T.: "Portland Eye Maker Finds Plastic to End Nazi's Grip," Oregon Journal, October 11, 1942, page 7.

McKechnie, Elizabeth: "Apt Pupils," C. I. L. Oval, December 1944, pp. 8–9.

"Plastic Artificial Eyes," Science News Letter, January 13, 1945, page 19.

Copies of above available in Division 55.